US011838832B2

(12) United States Patent
Yan et al.

(10) Patent No.: US 11,838,832 B2
(45) Date of Patent: Dec. 5, 2023

(54) METHOD FOR ADJUSTING MULTICAST BROADCAST SERVICE AREA AND NETWORK APPARATUS USING THE SAME

(71) Applicant: Industrial Technology Research Institute, Hsinchu (TW)

(72) Inventors: Yu-Dai Yan, Tainan (TW); Shu-Ping Chang, Hsinchu (TW); Tzu-Hsiang Su, Taipei (TW); Kuo-Huang Hsu, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 159 days.

(21) Appl. No.: 17/134,489

(22) Filed: Dec. 27, 2020

(65) Prior Publication Data
US 2022/0210613 A1   Jun. 30, 2022

(51) Int. Cl.
H04W 4/06       (2009.01)
H04L 12/18      (2006.01)
H04W 48/04      (2009.01)
H04W 72/30      (2023.01)

(52) U.S. Cl.
CPC ............. *H04W 4/06* (2013.01); *H04L 12/189* (2013.01); *H04W 48/04* (2013.01); *H04W 72/30* (2023.01)

(58) Field of Classification Search
CPC ........ H04L 12/189; H04W 4/06; H04W 4/40; H04W 48/04; H04W 72/005
See application file for complete search history.

(56) References Cited

U.S. PATENT DOCUMENTS

| | | | | |
|---|---|---|---|---|
| 9,369,902 | B1* | 6/2016 | Sandhu | H04W 24/08 |
| 11,096,016 | B2* | 8/2021 | Chen | H04W 72/21 |
| 2009/0190517 | A1 | 7/2009 | Maezawa | |
| 2012/0307707 | A1* | 12/2012 | Wang | H04W 72/005 370/312 |
| 2014/0080475 | A1* | 3/2014 | Gholmieh | H04W 4/06 455/422.1 |

(Continued)

FOREIGN PATENT DOCUMENTS

| | | |
|---|---|---|
| CN | 102264030 | 11/2011 |
| CN | 110876118 A | 3/2020 |

(Continued)

OTHER PUBLICATIONS

"Office Action of Taiwan Counterpart Application", dated Nov. 30, 2021, p. 1-p. 5.
Huawei et al., "Clarify the MBMS session update procedure." 3GPP SA WG2 Meeting #104, Dublin, Ireland, Jul. 7-11, 2014, pp. 1-3.
3GPP, "Technical Specification; 3rd Generation Partnership Project; Technical Specification Group Services and System Aspects; Multimedia Broadcast/Multicast Service (MBMS); Architecture and functional description (Release 16)", 3GPP TS 23.246 V16.1.0, Sep. 2019, pp. 1-77.

(Continued)

*Primary Examiner* — Thomas R Cairns
*Assistant Examiner* — Kai Chang
(74) *Attorney, Agent, or Firm* — JCIPRNET

(57) ABSTRACT

An aspect of the disclosure includes a method for adjusting a multicast broadcast service area. According to an exemplary embodiment, the method may include, but is not limited to, the following steps. A cell list in a session update request message is obtained. An old broadcast target area for a multicast broadcast service is adjusted to a new broadcast target area for the multicast broadcast service according to the cell list. At least one base station is controlled to allocate or release radio spectrum resources for the multicast broadcast service.

18 Claims, 13 Drawing Sheets

(56) References Cited

U.S. PATENT DOCUMENTS

| | | | | |
|---|---|---|---|---|
| 2015/0124686 A1* | 5/2015 | Zhang | ............... | H04W 24/02 370/312 |
| 2017/0339612 A1* | 11/2017 | Quan | ............... | H04W 68/02 |
| 2018/0295563 A1 | 10/2018 | Lisewski et al. | | |
| 2018/0324559 A1 | 11/2018 | Byun et al. | | |
| 2018/0359104 A1* | 12/2018 | Byun | ............... | H04W 76/00 |
| 2019/0090098 A1* | 3/2019 | Byun | ............... | H04W 76/00 |
| 2019/0150077 A1* | 5/2019 | Byun | ............ | H04W 36/0061 455/434 |
| 2019/0174271 A1 | 6/2019 | Fujishiro et al. | | |
| 2019/0274011 A1* | 9/2019 | Yoshizawa | ............ | H04W 40/246 |
| 2020/0092685 A1* | 3/2020 | Fehrenbach | ............ | H04W 72/23 |
| 2020/0260239 A1* | 8/2020 | Ahn | ............... | G08G 1/0112 |
| 2021/0084453 A1* | 3/2021 | Wang | ............... | H04W 4/021 |
| 2022/0030411 A1* | 1/2022 | Venkatram | ............ | H04W 76/50 |
| 2022/0070740 A1* | 3/2022 | Futaki | ............... | H04W 36/08 |

FOREIGN PATENT DOCUMENTS

| | | | | |
|---|---|---|---|---|
| TW | I457019 | 10/2014 | | |
| TW | I492564 | 7/2015 | | |
| TW | I622308 | 4/2018 | | |
| TW | I692268 | 4/2020 | | |
| WO | WO-2008098498 A1 * | 8/2008 | ............ | H04L 12/189 |
| WO | 2015069407 | 5/2015 | | |

OTHER PUBLICATIONS

Ericsson, "CB: # 20_MBS_DynTXareaCtrl—Summary of email discussion." 3GPP TSG-RAN WG3 #109-e, Online, Aug. 17-27, 2020, pp. 1-7.

"Search Report of Europe Counterpart Application", dated Jul. 7, 2021, p. 1-p. 11.

Christophoros Christophorou, et al., "A new approach for efficient MBMS service provision in UTRAN" IEEE Symposium on Computers and Communications, Jul. 6-9, 2008, pp. 1-6.

N. F. Tuban, et al., "Genetic algorithm approach for dynamic configuration of Multicast Broadcast Single Frequency Network deployment in LTE", ICIMU 2011 : Proceedings of the 5th international Conference on Information Technology & Multimedia, Nov. 14-16, 2011, pp. 1-5.

Christopher Cox, "Enhancements in Release 9", An Introduction to LTE: LTE, LTEAdvanced, SAE, VoLTE and 4G Mobile Communications, 2014, pp. 1-56.

Wolfgang Kampichler, et al., "Location based communication services for UAS in the NAS", IEEE/AIAA 35th Digital Avionics Systems Conference (DASC), Sep. 25-29, 2016, pp. 1-7.

Marco Fiore, et al., "Persistent Localized Broadcasting in VANETs", IEEE Journal on Selected Areas in Communications/Supplement, vol. 31, No. 9, Jul. 2, 2013, pp. 480-490.

* cited by examiner

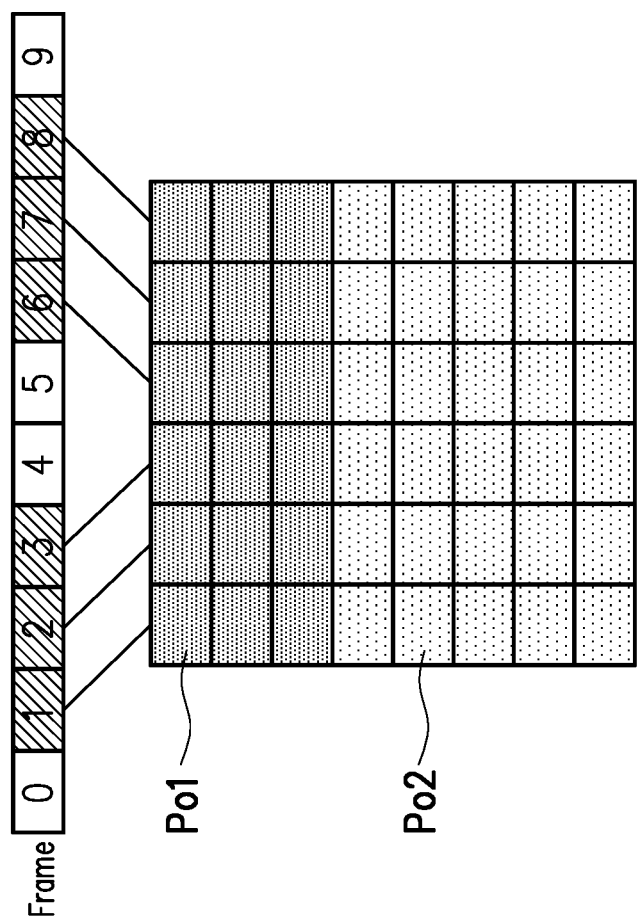

METHOD FOR ADJUSTING MULTICAST BROADCAST SERVICE AREA AND NETWORK APPARATUS USING THE SAME

BACKGROUND

Technical Field

The disclosure relates to a method for adjusting a multicast broadcast service area and a network apparatus using the same.

Description of Related Art

With the evolution of various wireless technologies, the focus has shifted to providing other services in addition to voice services, such as multimedia or data services. In order to comply with the bandwidth restrictions imposed by various multimedia services, the multicast broadcast service (MB S) or the multimedia broadcast multicast service (MBMS) has emerged as an implementation solution to provide broadcast services in current cellular mobile networks. Specifically, in the delivery of multimedia contents, the multicast broadcast service is characterized by delivery from one single point to multiple points, and this characteristic makes it possible to more efficiently utilize the limited radio spectrum resources. With the above characteristic, the multicast broadcast service technology has come to be widely applied to wireless multimedia transmission. Currently, the multimedia multicast broadcast service may adopt the transmission method of the multicast broadcast single frequency network (MBSFN). In this transmission method, multiple base stations in the same MBSFN area may simultaneously broadcast the same broadcast service content to reduce interference between adjacent base stations. The above broadcast service content is, for example, concert or traffic information, etc.

In the current operation of the multicast broadcast service using the MBSFN, the telecom operator generally plans MBSFN areas in advance, so that all base stations in the same MBSFN area simultaneously perform the broadcast service. The telecom operator plans the area size covered by each MBSFN area in advance. To satisfy various application service requirements, the division of MBSFN areas is generally rough and the MBSFN areas are generally planned to have a larger area. As a result, the broadcast area actually required by the application service is likely to be different from the broadcast area formed by one or more MBSFN areas. If there is a gap between the broadcast area actually required and the MBSFN area preset by the telecom operator, generally, some base stations may allocate radio spectrum resources to perform unnecessary broadcast services, and some user equipments may thus receive broadcast information irrelevant to themselves, thus wasting the radio spectrum resources.

For example, FIG. 1 is a schematic view showing broadcast of a V2X (vehicle to everything) message to different MBSFN areas. As shown in FIG. 1, the telecom operator plans 3 MBSFN areas 101, 102, and 103 in advance. The registered MBSFN areas 101, 102, and 103 of the V2X road information broadcast service serve as MBMS service areas. When an emergency road event occurs at an event location P1, the users who are actually affected by the emergency road event are users located within a range R1. However, according to the current mechanism, not only do base stations bs1 and bs2 in the range R1 both broadcast a V2X service message, but all other base stations in the MBSFN area 101, 102, and 103 also broadcast the same V2X service message. As a result, users irrelevant to the emergency road event also receive the notification of the emergency road event.

If the range of the MBSFN area is to be changed, the telecom operator shall send someone to perform relevant settings. This approach is not only impractical, but it cannot change the broadcast range of the multicast broadcast service in real time, and cannot set different broadcast ranges for different application services or temporary emergencies. Therefore, it will lead to a waste of radio spectrum resources and lower the use efficiency of unicast.

SUMMARY

The disclosure relates to a method for adjusting a multicast broadcast service area and a network apparatus using the same.

In an exemplary embodiment, the disclosure relates to a method for adjusting a multicast broadcast service area, and the method is adapted for a network apparatus. The method includes, but is not limited to, the following steps. A cell list in a session update request message is obtained. An old broadcast target area for a multicast broadcast service is adjusted to a new broadcast target area for the multicast broadcast service according to the cell list. At least one base station is controlled to allocate or release radio spectrum resources for the multicast broadcast service.

In an exemplary embodiment, the disclosure relates to a network apparatus including, but not limited to, a transceiver and a processor. The processor is coupled to the transceiver and is configured to perform the following operations. A cell list in a session update request message is obtained. An old broadcast target area for a multicast broadcast service is adjusted to a new broadcast target area for the multicast broadcast service according to the cell list. At least one base station is controlled to allocate or release radio spectrum resources for the multicast broadcast service.

To make the aforementioned and other features of the disclosure more comprehensible, exemplary embodiments accompanied with figures will be described in detail below. It is to be understood that both the foregoing general description and the following detailed description are exemplary, and are intended to provide further description of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4A is a schematic view showing a first resource pool and a second resource pool according to an embodiment of the disclosure.

DESCRIPTION OF THE EMBODIMENTS

Figure 1:
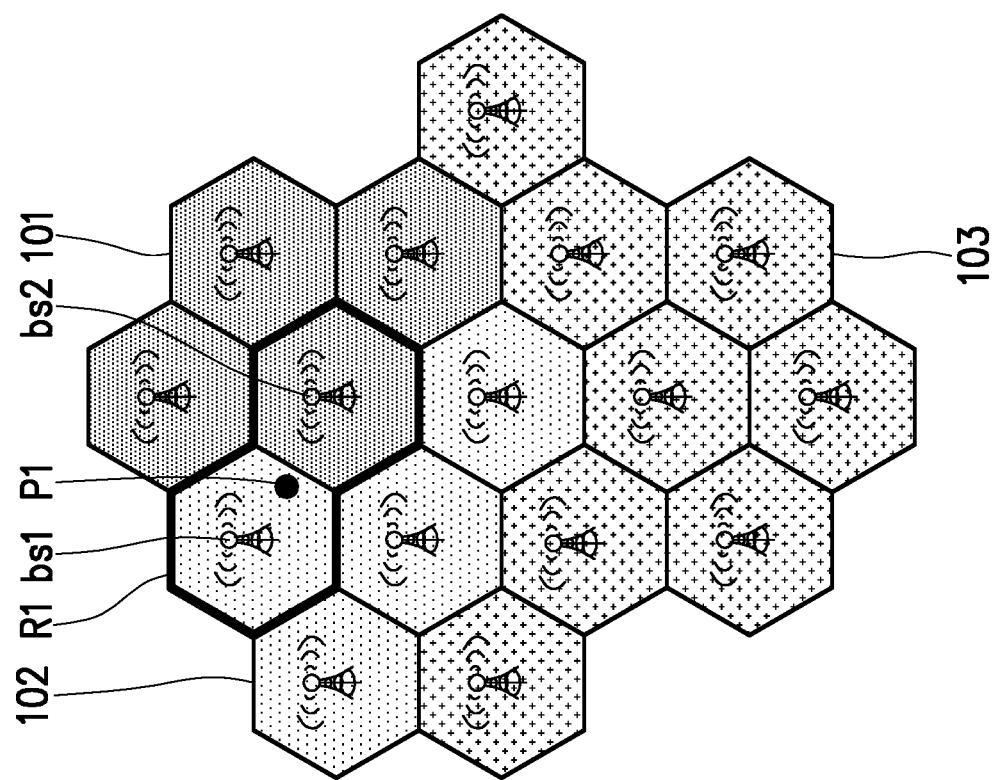
FIG. 1 is a schematic view showing broadcast of a V2X service message to different MBSFN areas.

To make the aforementioned and other features of the disclosure more comprehensible, exemplary embodiments accompanied with figures will be described in detail below. It is to be understood that both the foregoing general description and the following detailed description are exemplary, and are intended to provide further description of the disclosure as claimed.

In the disclosure, the terminology of the LTE standard specified by the Third Generation Partnership Project (3GPP) will be adopted for description of the exemplary embodiments. However, the same concept presented in the disclosure may be applied by those of ordinary skill in the art to any other communication system, e.g., a communication system using the 5G standard or other standards.

The network apparatus disclosed in the disclosure may be, for example, a multi-cell/multicast coordination entity (MCE) in a radio access network but is not limited thereto. The network apparatus is configured to manage spectrum resources for a multicast broadcast service, so that multiple base stations may use the same spectrum resources to simultaneously perform broadcast. The network apparatus of this embodiment of the disclosure may be connected to a multicast broadcast service control apparatus, and the multicast broadcast service control apparatus may be, for example, a broadcast multicast service center (BMSC). In an embodiment, the network apparatus may receive related messages of a multicast broadcast service, such as a session start request message, a session update request message, or other related messages, from the multicast broadcast service control apparatus.

In an embodiment, the multicast broadcast service control apparatus may obtain event-related information of an event from a service content provider. For example, the multicast broadcast service control apparatus may obtain a V2X message of a V2X service from the service content provider, and the V2X message may include event-related information of a road event. The event-related information may include an event coordinate location and a broadcast range. The multicast broadcast service control apparatus may determine a broadcast target area associated with the event according to the event coordinate location, the broadcast range, and the geographic locations of multiple base stations. In an embodiment, the multicast broadcast service control apparatus may determine the broadcast target area of the V2X message according to the event coordinate location, the broadcast range, and the geographic locations of multiple base stations to broadcast the V2X message by using the multicast broadcast service via multiple base stations. In an embodiment, when a V2X service uses the multicast broadcast service, the broadcast target area in the disclosure may be dynamically adjusted according to the location of the road event.

In an embodiment, after the multicast broadcast service control apparatus determines a new broadcast target area, the multicast broadcast service control apparatus may send a session update request message to the network apparatus, and the session update request message includes a cell list corresponding to the new broadcast target area. Therefore, the network apparatus may adjust an old broadcast target area for the multicast broadcast service to the new broadcast target area for the multicast broadcast service according to the cell list in the session update request message. Then, the network apparatus may control at least one base station to allocate or release radio spectrum resources for the multicast broadcast service. It is noted that the coverage of the broadcast target area (i.e., the old broadcast target area and the new broadcast target area) may be different from the range of one MBSFN area or the range composed of multiple MBSFN areas.

To describe the disclosure in more details, an example in which the network apparatus is an MCE and the multicast broadcast service control apparatus is a BMSC will be described below.

Figure 2:
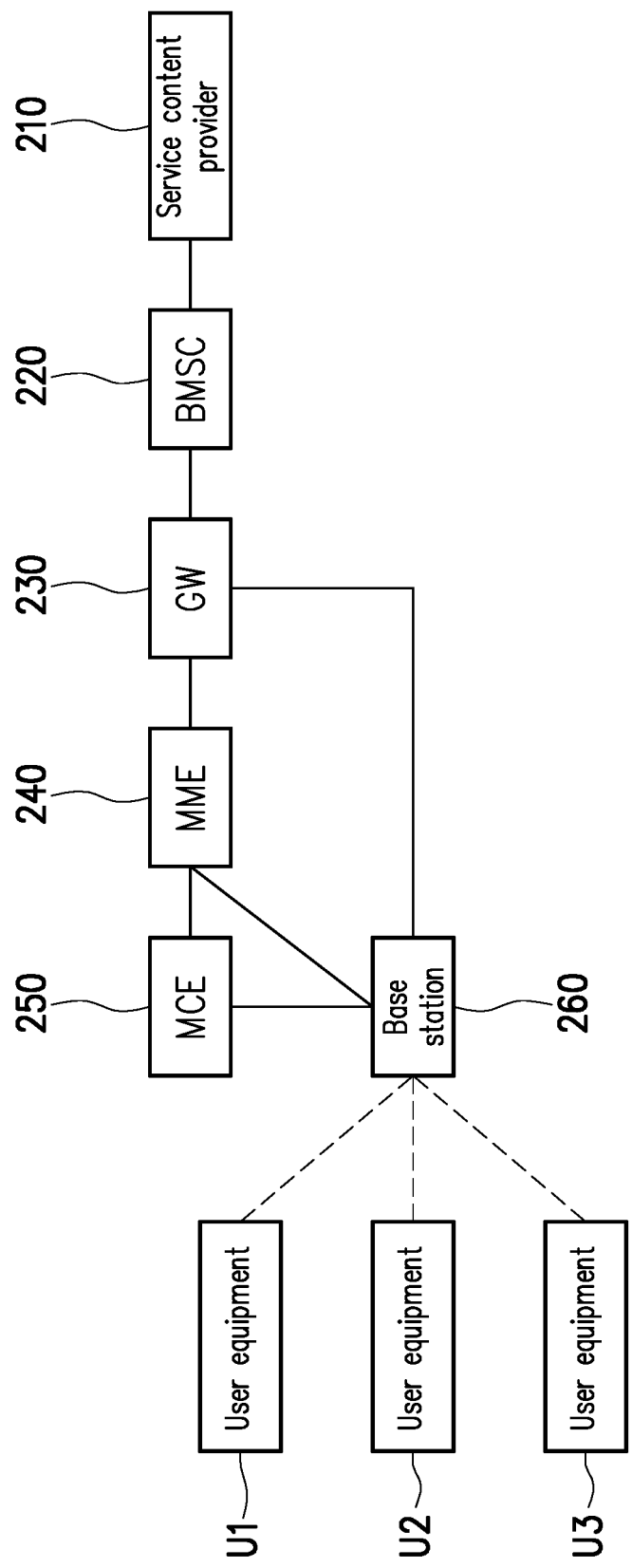
FIG. 2 is a schematic view showing an MBMS architecture according to an embodiment of the disclosure.

FIG. 2 is a schematic view showing an MBMS architecture according to an embodiment of the disclosure. Referring to FIG. 2, in an embodiment, an MBMS architecture 20 may include a service content provider 210, an BMSC 220, a gateway (GW) 230, a mobility management entity (MME) 240, an MCE 250, a base station 260, and multiple user equipments U1 to U3. In an embodiment, reference may be made to the current standards of the 3GPP communication protocols TS 23.246 and TS 36.300 for descriptions of the operations and functions of each device and network entity in the MBMS architecture 20 shown in FIG. 2.

The service content provider 210 may provide event-related information and a broadcast service content to the BMSC 220. For example, the service content provider 210 may provide a V2X message to the BMSC 220. The BMSC 220 is generally located in the core network and is responsible for session registration and authorization of the service content provider 210. When a new multicast broadcast session starts, the BMSC 220 receives session registration of the service content provider 210, and then the BMSC 220 sends a session start request message to the corresponding MME 240 via the GW 230. The MME 240 forwards the session start request message to the MCE 250, and the MCE 250 may allocate radio spectrum resources to the newly added multicast broadcast session. The MCE 250 may send a scheduling information message to the base station 260 according to the resource allocation result to have the base station 260 perform broadcast according to the radio spectrum resources indicated by the MCE 250. Accordingly, user equipments U1 to U3 located within the coverage of the base station 260 can all receive the broadcast service content from the base station 260.

In an embodiment, the BMSC 220 has geographic locations of multiple base stations (including the base station 260). The BMSC 220 may obtain event-related information from the service content provider 210, and screen and obtain part of the base stations related to the event according to the geographic locations of the multiple base stations and the event-related information to thereby determine the broadcast target area. The BMSC 220 may determine whether the broadcast target area has changed. In response to a change in the broadcast target area (i.e., a change in the set of cells making up the broadcast target area), the BMSC 220 may send a session update request message including a cell list to the MCE 250 to notify the MCE 250 to update the broadcast target area. The cell list may include cell IDs of multiple cells.

Figure 3:
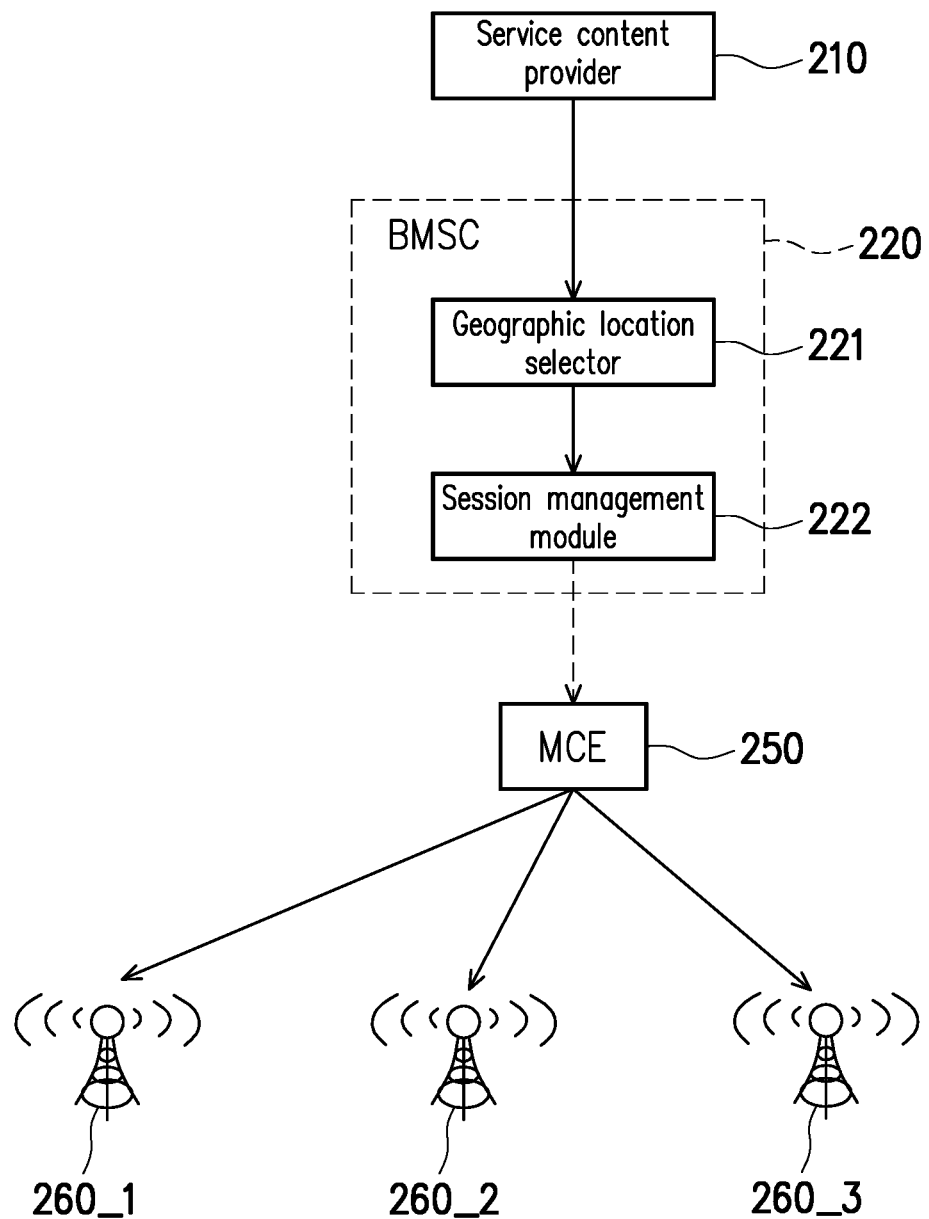
FIG. 3 is a schematic view showing cooperative adjustment of a broadcast target area by a BMSC and an MCE according to an embodiment of the disclosure.

FIG. 3 is a schematic view showing cooperative adjustment of the broadcast target area by the BMSC and the MCE according to an embodiment of the disclosure. Referring to FIG. 3, the BMSC 220 may include a geographic location selector 221 and a session management module 222. The service content provider 210 may provide event-related information to the geographic location selector 221. The geographic location selector 221 may determine the target broadcast area of the multicast broadcast session according to the event-related information and geographic locations of multiple base stations. The session management module 222 may determine whether the broadcast target area has changed. In response to a change in the broadcast target area (i.e., the old broadcast target area determined at a previous time is different from the new broadcast target area determined at the current time), the session management module 222 may send a session update request message including a cell list to the MCE 250 to notify the MCE 250 to update the broadcast target area.

When the MCE 250 receives the session update request message, the MCE 250 may obtain the cell list in the session update request message and thereby obtain the new broadcast target area. Therefore, the MCE 250 may adjust the old broadcast target area for the multicast broadcast service to the new broadcast target area for the multicast broadcast service according to the cell list. More specifically, by comparing the cells in the cell list with the cells in the old broadcast target area, the MCE 250 may add cells to the old broadcast target area or remove cells from the old broadcast target area to update the broadcast target area. In addition, the MCE 250 may notify base stations 260_1 to 260_3 whether to perform broadcast, and send a scheduling information message to the base stations 260_1 to 260_3 to control the base stations 260_1 to 260_3 to allocate or release the radio spectrum resources for the multicast broadcast service.

It is noted that, although the determination of the broadcast target area in the disclosure is not associated with the MBSFN area, the embodiments of the disclosure may be compatible with the current standard in the 3GPP communication protocol for performing the multicast broadcast service according to the MBSFN area. In an embodiment, the MCE 250 may identify that the multicast broadcast service session is in a first mode or a second mode, e.g., a geographic location mode and an MBSFN mode, respectively. Correspondingly, the MCE 250 may allocate a first resource pool used for the first mode and a second resource pool used for the second mode. The allocation status of the first resource pool and the second resource pool may be recorded in the MCE 250. Specifically, based on each registered multicast broadcast service session, the MCE 250 may respectively allocate corresponding available resources according to whether the multicast broadcast service session is in the first mode or the second mode, thereby dividing the available resources into the first resource pool used for the first mode and the second resource pool used for the second mode.

FIG. 4A is a schematic view showing the first resource pool and the second resource pool allocated by the MCE according to an embodiment of the disclosure. Referring to FIG. 4A, the MCE 250 may allocate subframes (SF) numbered '1', '2', '3', '6', '7', and '8' as multicast broadcast service subframes. The multicast broadcast service subframes are, for example, MBSFN subframes. The MCE 250 may divide the multicast broadcast service subframes into a first resource pool Po1 used for the geographic location mode and a second resource pool Po2 used for the MBSFN mode. The resource elements (RE) in the first resource pool Po1 are allocated to the multicast broadcast service belonging to the geographic location mode, and the resource elements in the second resource pool Po2 are allocated to the multicast broadcast service belonging to the MBSFN mode. In other words, the resource elements in the first resource pool Po1 may be configured to transmit a broadcast service content of one multicast broadcast service belonging to the geographic location mode. The resource elements in the second resource pool Po2 may be configured to transmit a broadcast service content of another multicast broadcast service belonging to the MBSFN mode.

Figure 4B:
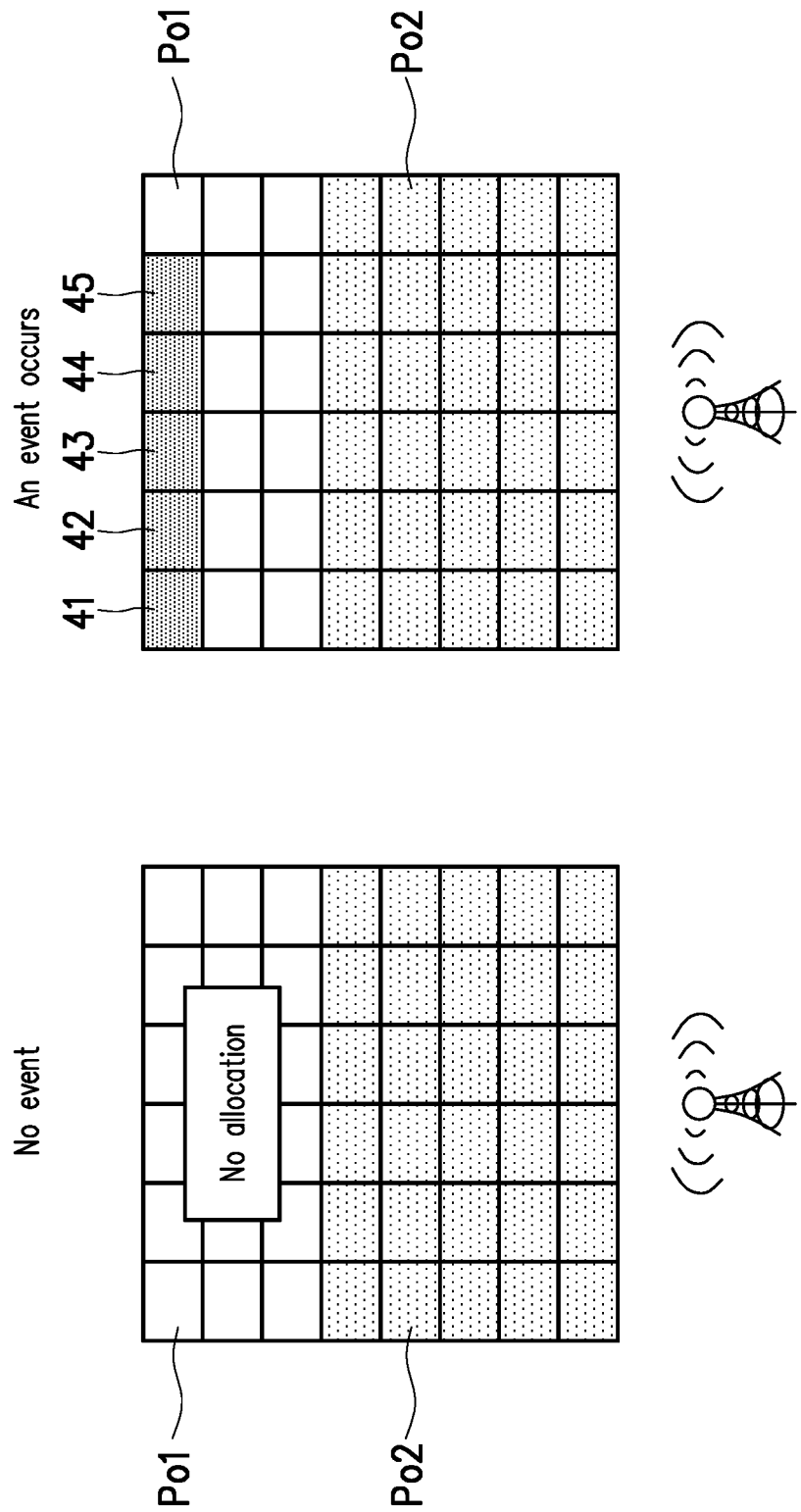
FIG. 4B is a schematic view showing allocation of radio spectrum resources for the multicast broadcast service according to the embodiment shown in FIG. 4A.

FIG. 4B is a schematic view showing allocation of the radio spectrum resources by the base station for the multicast broadcast service according to the embodiment shown in FIG. 4A. Referring to FIG. 4B, when no event occurs, the multicast broadcast service session is in a suspended state, and in the case where the MCE 250 has recorded that the resource elements in the first resource pool Po1 are allocated to the multicast broadcast service in the geographic location mode, the MCE 250 does not notify the base station to allocate the resource elements in the first resource pool Po1 to perform broadcast, so the base station may use the resource elements in the first resource pool Po1 to perform unicast. When an event occurs (i.e., when the BMSC receives a broadcast service content from the service content provider), the multicast broadcast service session is set to an active state. As the MCE 250 has allocated and reserved resource elements 41, 42, 43, 44, and 45 in the first resource pool Po1 to the multicast broadcast service belonging to the geographic location mode, the MCE 250 may further notify the base station to allocate the resource elements 41, 42, 43, 44, and 45 in the first resource pool Po1 to perform broadcast. It is noted that, in the case where the MCE 250 does not notify the base station to allocate other resource elements in the first resource pool Po1 to perform broadcast, the base station can still use other resource elements in the first resource pool Po1 determined by the MCE 250 to perform unicast. On the other hand, in this example, when the base station uses the resource elements 41, 42, 43, 44, and 45 to perform the multicast broadcast service in the geographic location mode, the base station may simultaneously use the resource elements in the second resource pool Po2 to perform a multicast broadcast service in the MBSFN mode.

Figure 5:
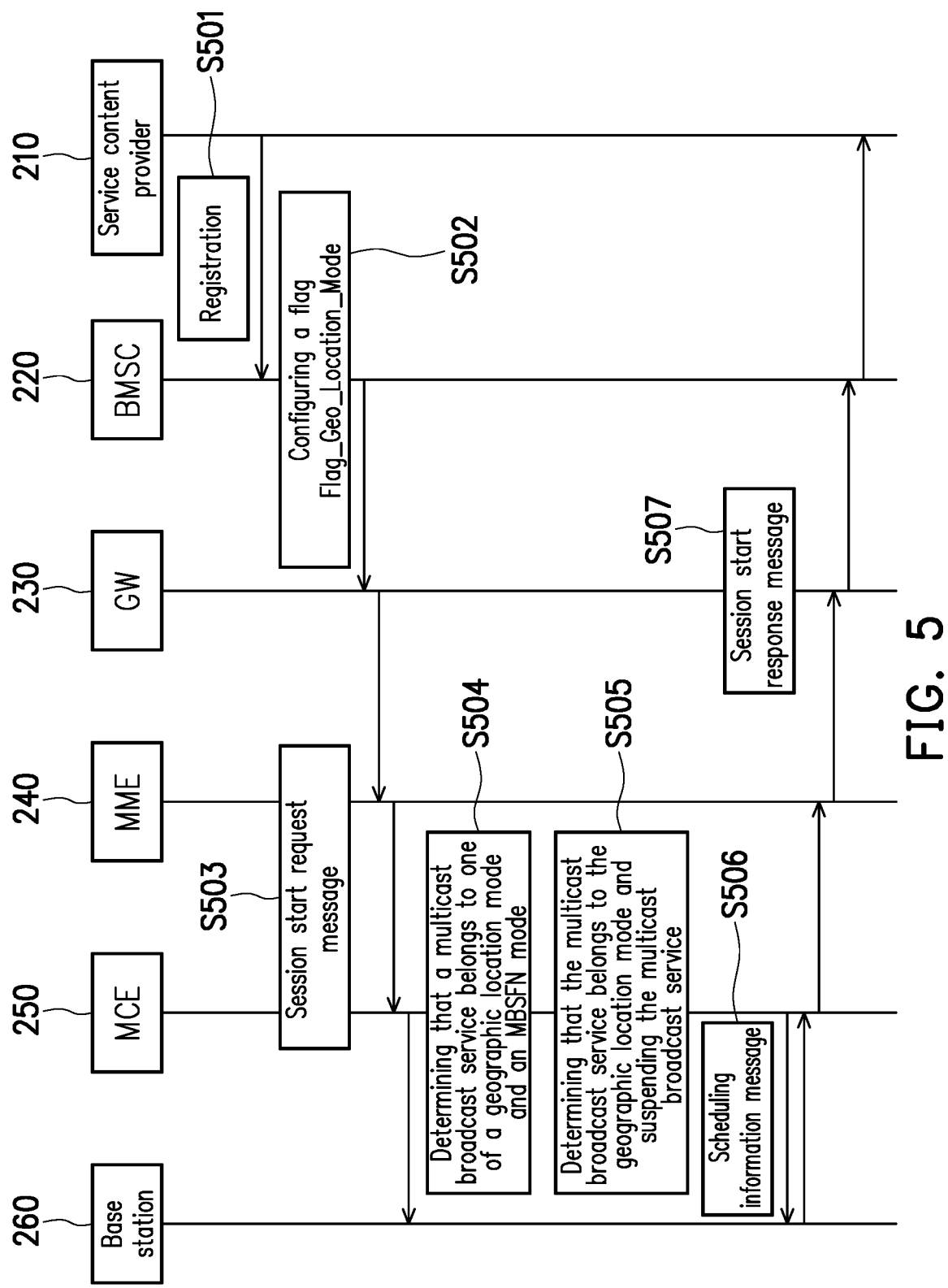
FIG. 5 is a flowchart showing an initialization process for initiating a multicast broadcast session according to an embodiment of the disclosure.

FIG. 5 is a flowchart showing an initialization process for initiating a multicast broadcast session according to an embodiment of the disclosure. Referring to FIG. 5, in step S501, the service content provider 210 may register a multicast broadcast service session with the BMSC 220. In step S502, the BMSC 220 may configure a flag Flag_Geo_Location_Mode associated with the multicast broadcast service session according to the registration information provided by the service content provider 210 to indicate that the multicast broadcast service session belongs to the geographic location mode or the MBSFN mode. In step S503, the BMSC 220 may send a session start request message of the multicast broadcast service to the gateway 230, the MME 240, the MCE 250, and the base station 260. In step S504, the MCE 250 may obtain the flag Flag_Geo_Location_Mode in the session start request message of the multicast broadcast service to determine that the multicast broadcast service belongs to one of the geographic location mode and the MBSFN mode according to the flag Flag_Geo_Location_Mode. In step S505, in response to the flag Flag_Geo_Location_Mode matching a predetermined value (e.g., the flag Flag_Geo_Location_Mode is equal to 1), the MCE 250 determines that the multicast broadcast service belongs to the geographic location mode and suspends the multicast broadcast service. In other words, when the multicast broadcast service belongs to the geographic location mode, the MCE 250 first configures the multicast broadcast service session as the suspended state. In step S506, the MCE 250 may notify the base station 260 to configure the multicast broadcast service session as the suspended state through a scheduling information message. Although the MCE 250 has allocated the first resource pool to the multicast broadcast service in the geographic location mode, it does not notify the base station of the allocation result, and when the multicast broadcast service session is in the suspended state, the base station may still use the resource elements in the first resource pool to perform unicast. In step S507, the base station 260 may send a session start response message to the BMSC 220 and the service content provider 210 via the MCE 250, the MME 240, and the gateway 230.

Figure 6:
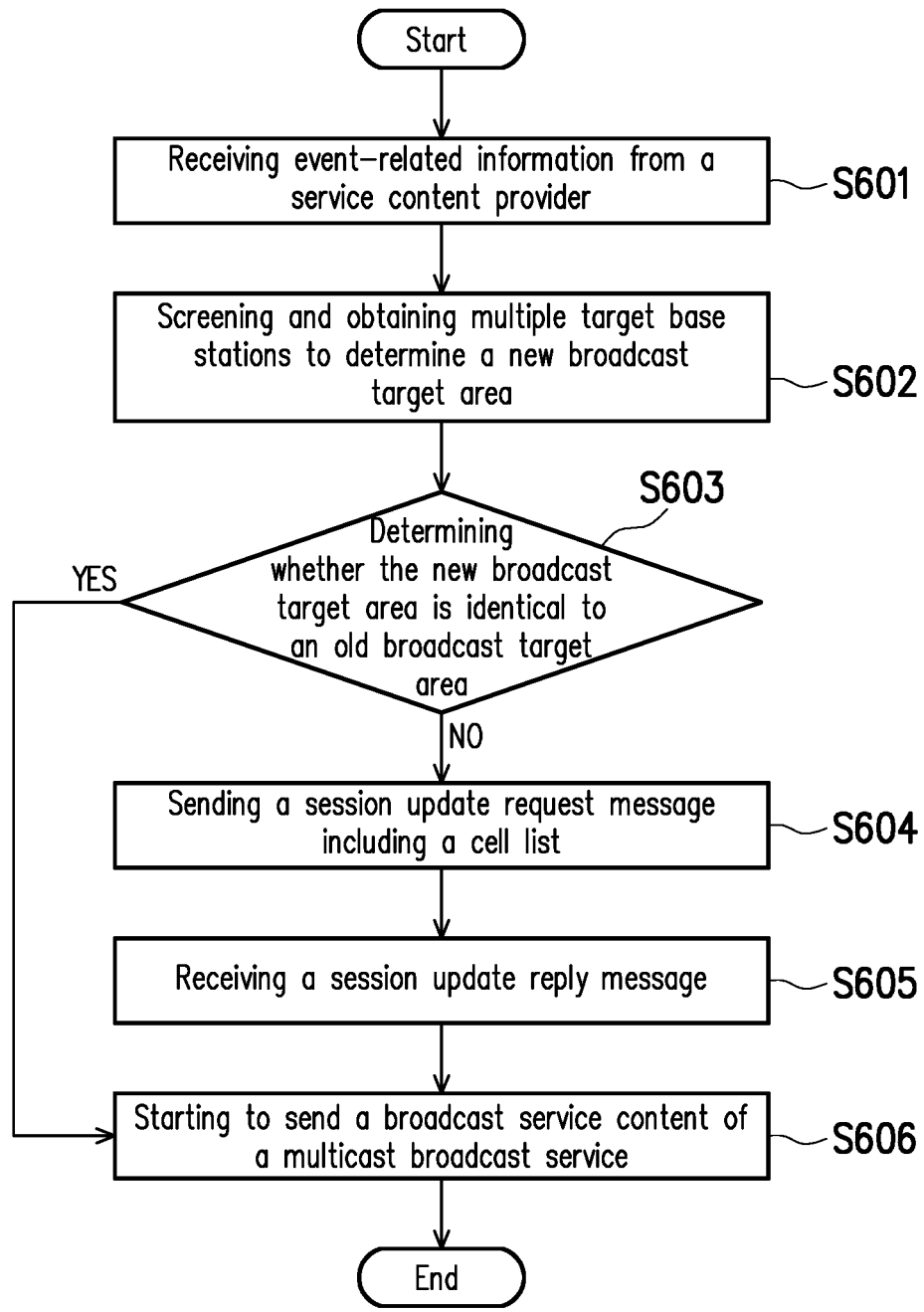
FIG. 6 is a flowchart showing adjustment of a broadcast target area according to an embodiment of the disclosure.

FIG. 6 is a flowchart showing adjustment of a broadcast target area according to an embodiment of the disclosure. The steps shown in FIG. 6 may be executed by the BSMC 220. Referring to FIG. 6, in step S601, the BSMC 220 receives event-related information from the service content provider 210. In step S602, the BSMC 220 screens and obtains multiple target base stations to determine a new broadcast target area. In step S603, the BSMC 220 determines whether the new broadcast target area is identical to an old broadcast target area. If the determination in step S603 is "NO", in step S604, the BSMC 220 sends a session update request message including a cell list to the MCE 250, so that the MCE 250 can update the broadcast target area according to the cell list. The cell list indicates multiple target base stations of the new broadcast target area. After the MCE 250 completes the allocation of the radio spectrum resources, in step S605, the BSMC 220 receives a session update reply message from the MCE 250. In step S606, in response to receiving the session update reply message, the BSMC 220 starts to send a broadcast service content of the multicast broadcast service. If the determination in step S603 is "YES", the BSMC 220 may directly execute step S606.

Figure 7:
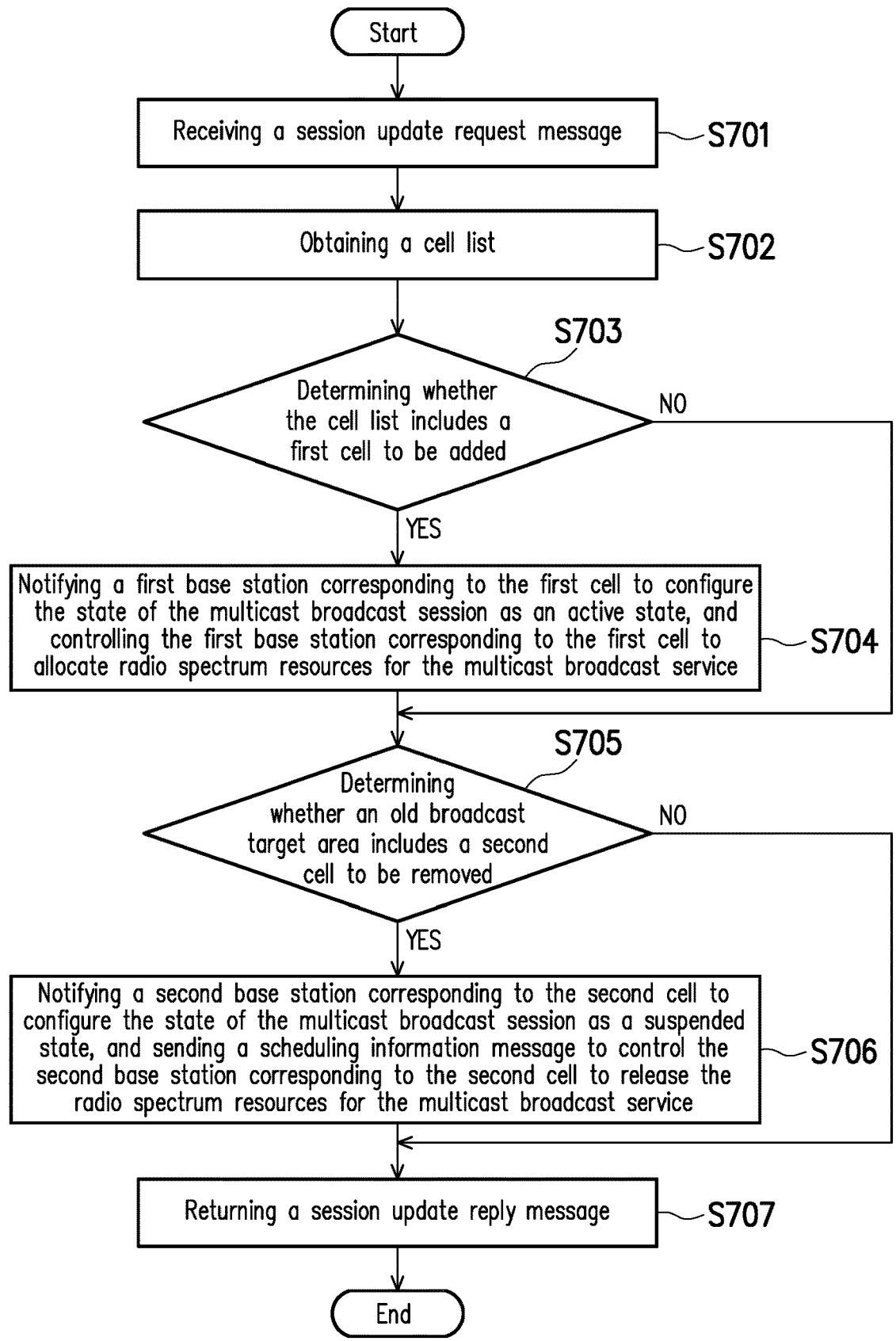
FIG. 7 is a flowchart showing adjustment of a broadcast target area according to an embodiment of the disclosure.

FIG. 7 is a flowchart showing adjustment of a broadcast target area according to an embodiment of the disclosure. The steps shown in FIG. 7 may be executed by the MCE 250. Referring to FIG. 7, in step S701, the MCE 250 receives a session update request message from the BSMC 220. In step S702, the MCE 250 obtains a cell list in the session update request message. In step S703, the MCE 250 determines whether the cell list includes a first cell to be added. If the determination in step S703 is "YES", in response to the cell list including the first cell but the old broadcast target area not including the first cell, the MCE 250 adjusts the old broadcast target area to a new broadcast target area by adding the first cell, and controls the base station of the first cell to allocate the radio spectrum resources. Therefore, in step S704, the MCE 250 notifies a first base station corresponding to the first cell to configure the state of the multicast broadcast session as the active state, and controls the first base station corresponding to the first cell to allocate the radio spectrum resources for the multicast broadcast service.

In step S705, the MCE 250 determines whether the old broadcast target area includes a second cell to be removed. If the determination in step S705 is "YES", in response to the old broadcast target area including the second cell but the cell list not including the second cell, the MCE 250 adjusts the old broadcast target area to the new broadcast target area by removing the second cell. Therefore, in step S706, the MCE 250 notifies a second base station corresponding to the second cell to configure the state of the multicast broadcast session as the suspended state, and sends a scheduling information message to control the second base station corresponding to the second cell to release the radio spectrum resources for the multicast broadcast service. In step S707, the MCE 250 returns a session update reply message to the BSMC 220. In an embodiment, after the MCE 250 updates the broadcast target area and completes the allocation of the radio spectrum resources, multiple target base stations of the new broadcast target area may start the multicast broadcast service. Based on the resource elements in the first resource pool reserved by the MCE 250 for the multicast broadcast service belonging to the geographic location mode, the target base station may allocate the resource elements in the first resource pool based on the notification of the MCE to send a broadcast service content, and the target base station sends the broadcast service content according to the same resource elements.

Figure 8A:
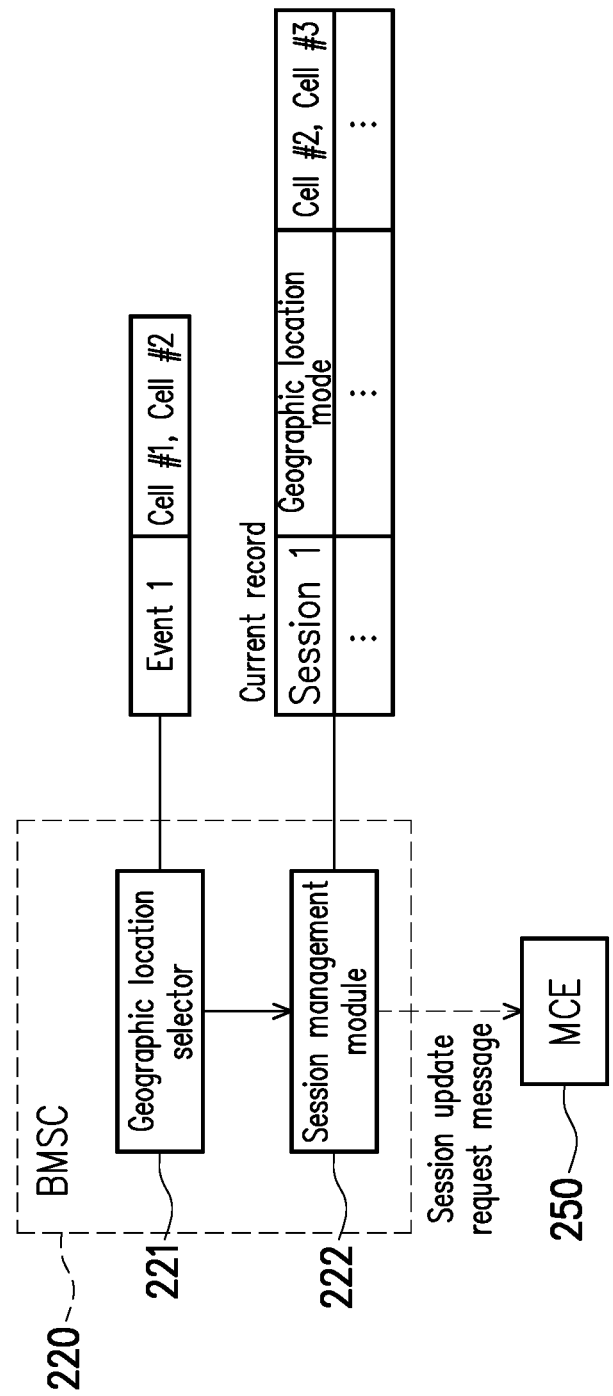
FIG. 8A and FIG. 8B are schematic views showing adjustment of a broadcast target area according to an embodiment of the disclosure.
Figure 8B:
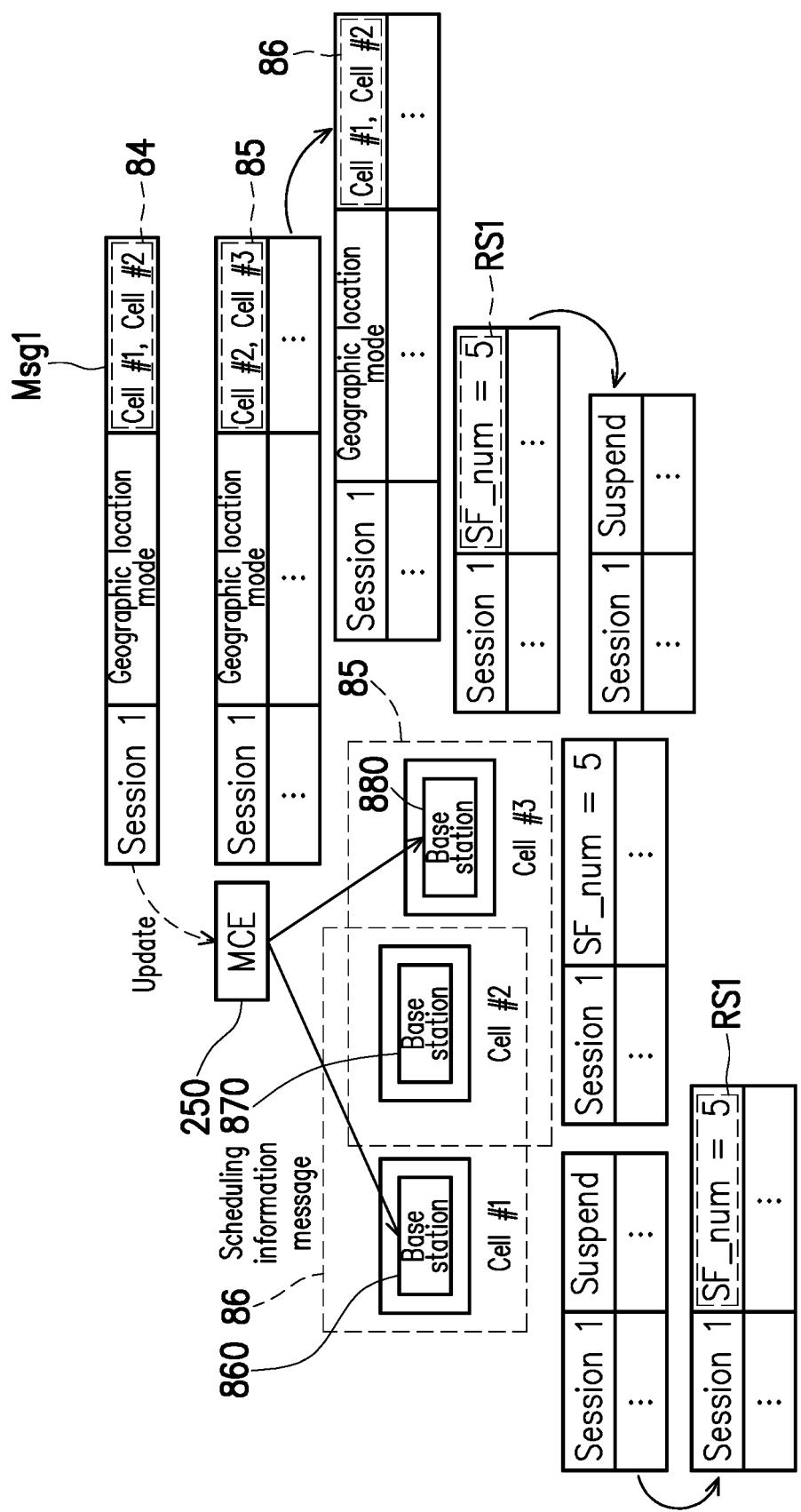

FIG. 8A and FIG. 8B are schematic views showing adjustment of a broadcast target area according to an embodiment of the disclosure. Referring to FIG. 8A first, in response to occurrence of a road event, the geographic location selector 221 of the BMSC 220 may screen and obtain a cell #1 and a cell #2 according to event-related information and database knowledge and provide cell IDs of the cell #1 and the cell #2 to the session management module 222. The combination of the cell #1 and the cell #2 is the new broadcast target area. Based on the old broadcast target area being a combination of the cell #2 and a cell #3, the session management module 222 determines that the new broadcast target area is different from the old broadcast target area. Therefore, the session management module 222 updates the broadcast target area of the multicast broadcast service according to the cell #1 and the cell #2, the session management module 222 sends a session update request message including a cell list to the MCE 250, and the cell list includes the cell IDs of the cell #1 and the cell #2.

Referring to FIG. 8B next, after receiving a session update request message Msg1, the MCE 250 checks a cell list 84 in the session update request message Msg1. In response to the cell list 84 including the cell #1 but the old broadcast target area 85 not including the cell #1, the MCE 250 adds the cell #1. In response to the cell list 84 not including the cell #3 but the old broadcast target area 85 including the cell #3, the MCE 250 removes the cell #3. Therefore, the MCE 250 can adjust the old broadcast target area 85 to the new broadcast target area 86.

In response to adjusting the old broadcast target area 85 to the new broadcast target area 86, the MCE 250 may send a scheduling information message to a base station 860 of the cell #1 to control the base station 860 to configure the multicast broadcast service session as the active state and allocate the radio spectrum resources RS1. In this example, the base stations 860 and 870 may use five resource elements (five subframes (SF num=5)) to send the broadcast service content according to the resource allocation result of the MCE 250, but this is only an example and is not intended to limit the disclosure. In addition, in response to adjusting the old broadcast target area 85 to the new broadcast target area 86, the MCE 250 may send a scheduling information message to a base station 880 of the cell #3 to control the base station 880 to configure the multicast broadcast service session as the suspended state and release the radio spectrum resources RS1. As shown in FIG. 8B, in an embodiment, since both the old broadcast target area 85 and the new broadcast target area 86 include the cell #2, the MCE 250 may skip sending a scheduling information message to the base station 870 of the cell #2.

Figure 9:
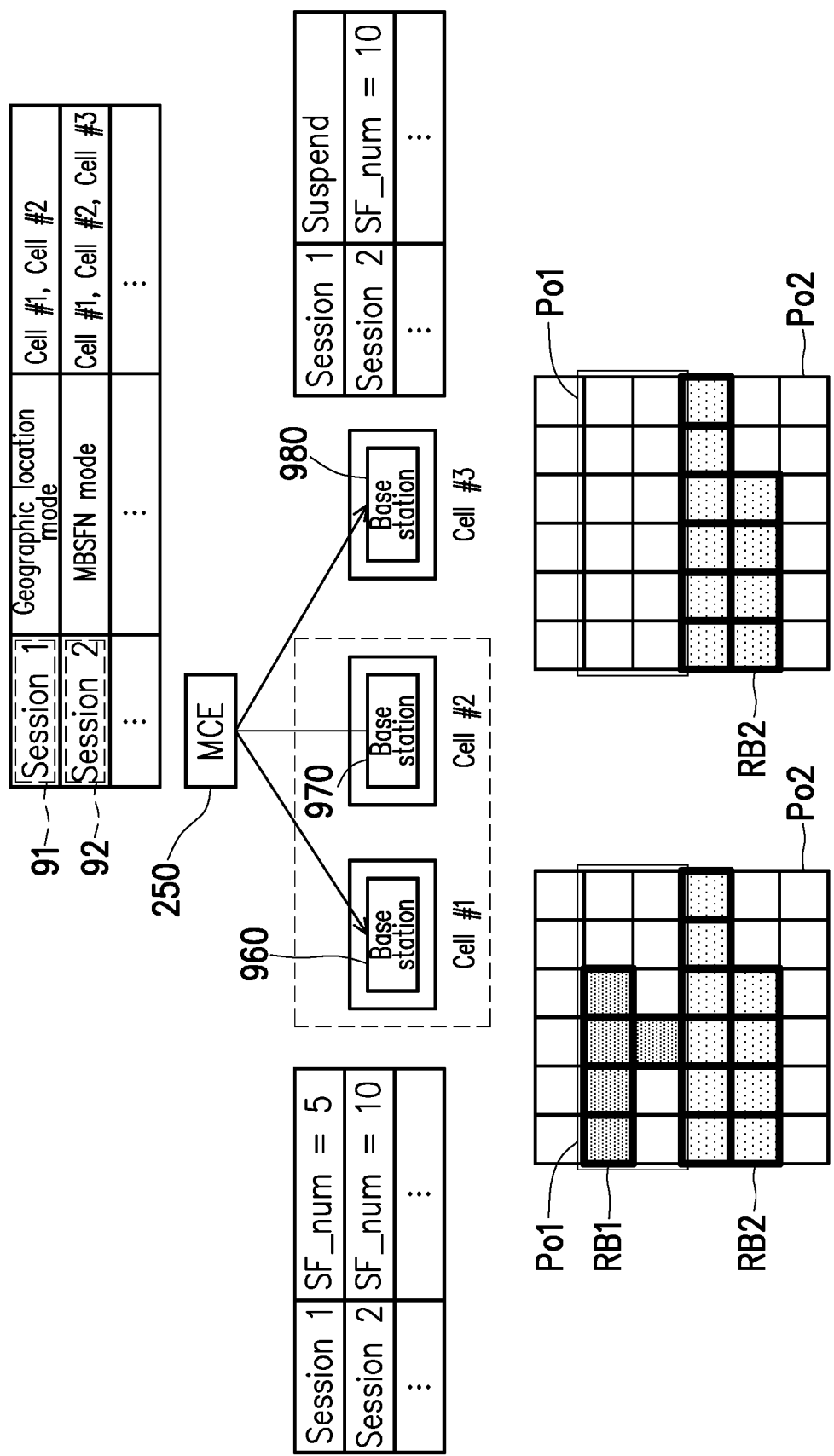
FIG. 9 is a schematic view showing allocation of the radio spectrum resources according to an embodiment of the disclosure.

FIG. 9 is a schematic view showing allocation of the radio spectrum resources according to an embodiment of the disclosure. Referring to FIG. 9, the broadcast target area of a multicast broadcast service 91 belonging to the geographic location mode includes a cell #1 and a cell #2. The broadcast target area of a multicast broadcast service 92 belonging to the MBSFN mode includes the cell #1, the cell #2, and a cell #3. The MCE 250 may allocate a resource block RB1 composed of multiple resource elements in the first resource pool Po1 to the multicast broadcast service 91 belonging to the geographic location mode. The MCE 250 may allocate a resource block RB2 composed of multiple resource elements in the second resource pool Po2 to the multicast broadcast service 92 belonging to the MBSFN mode. As shown in FIG. 9, a base station 960 of the cell #1 and a base station 970 of the cell #2 may use the resource block RB1 to perform the multicast broadcast service 91 and use the resource block RB2 to perform the multicast broadcast service 92. On the other hand, a base station 980 of the cell #3 may use the resource block RB2 to perform the multicast broadcast service 92. It is noted that the base station 980 may use the resource elements in the first resource pool Po1 to perform a unicast service to improve the use efficiency of the radio spectrum resources.

Figure 10:
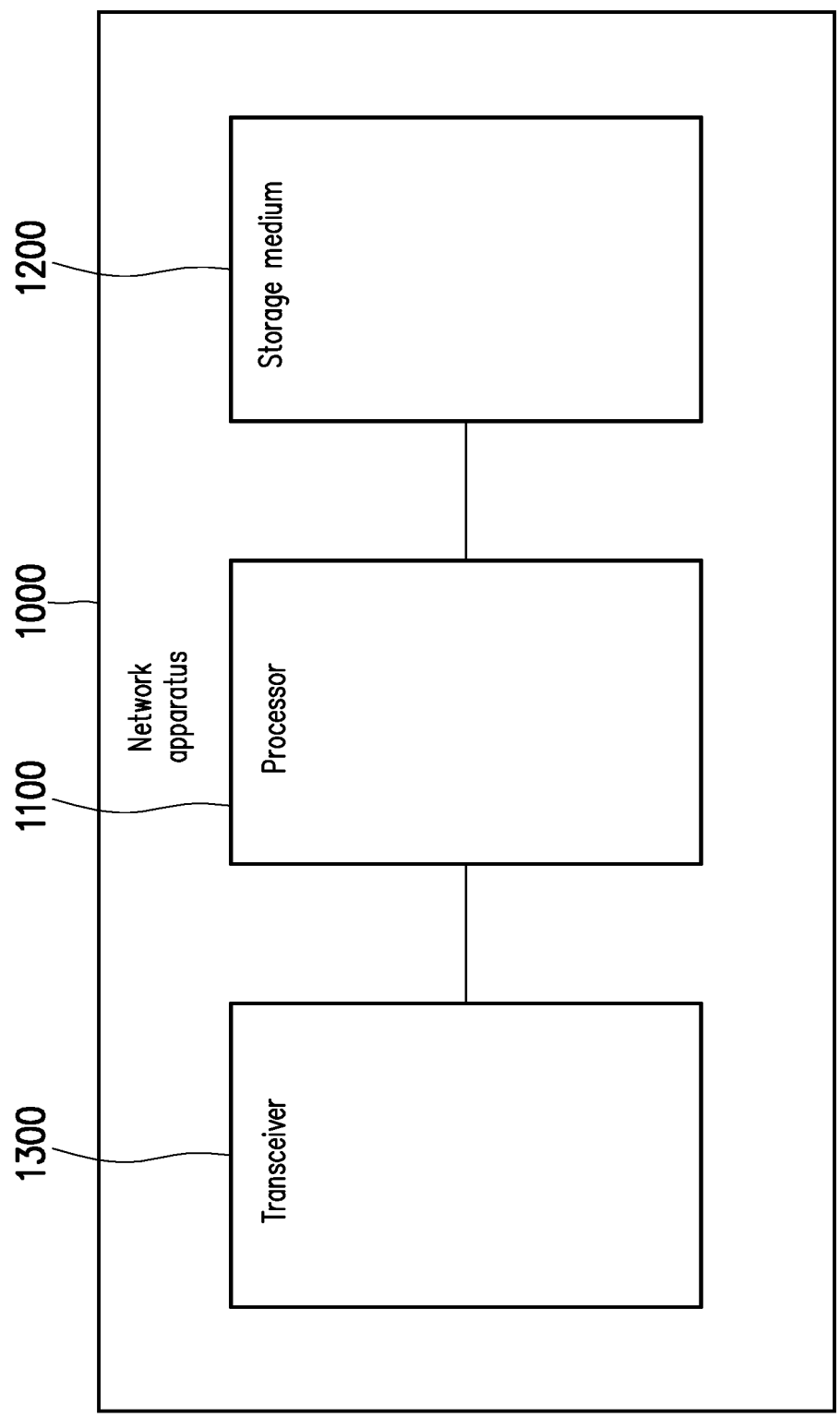
FIG. 10 is a schematic view showing a network apparatus according to an embodiment of the disclosure.

FIG. 10 is a schematic view showing a network apparatus according to an embodiment of the disclosure. A network apparatus 1000 may include a processor 1100, a storage medium 1200, and a transceiver 1300. The processor 1100 is coupled to the storage medium 1200 and the transceiver 1300. In an embodiment, the processor 1100 is configured to implement at least the method used by the MCE 250.

The processor 1100 may be implemented by using a programmable design unit such as a microprocessor, a microcontroller, a DSP chip, and an FPGA. An individual electronic device or IC may also be used to implement the functions of the processor 1100. It is noted that the functions of the processor 1100 may be implemented by hardware or software.

The storage medium 1200 may be, for example, configured to record multiple modules or multiple applications executable by the processor 1100 and may be any type of fixed or movable random access memory (RAM), read-only memory (ROM), flash memory, hard disk drive (HDD), solid state drive (SSD), similar devices, or a combination thereof.

The transceiver 1300 may be configured to transmit and receive a signal. The signal may be a radio frequency (RF) signal, an optical signal, or a signal transmitted via a cable. The transceiver 1300 may also perform operations such as low noise amplification, impedance matching, frequency mixing, frequency up or down conversion, filtering, amplification, and the like. The analog-to-digital (A/D) converter is configured to convert a signal from an analog signal format to a digital signal format, and the digital-to-analog (D/A) converter is configured to convert a signal from a digital signal format to an analog signal format.

Figure 11:
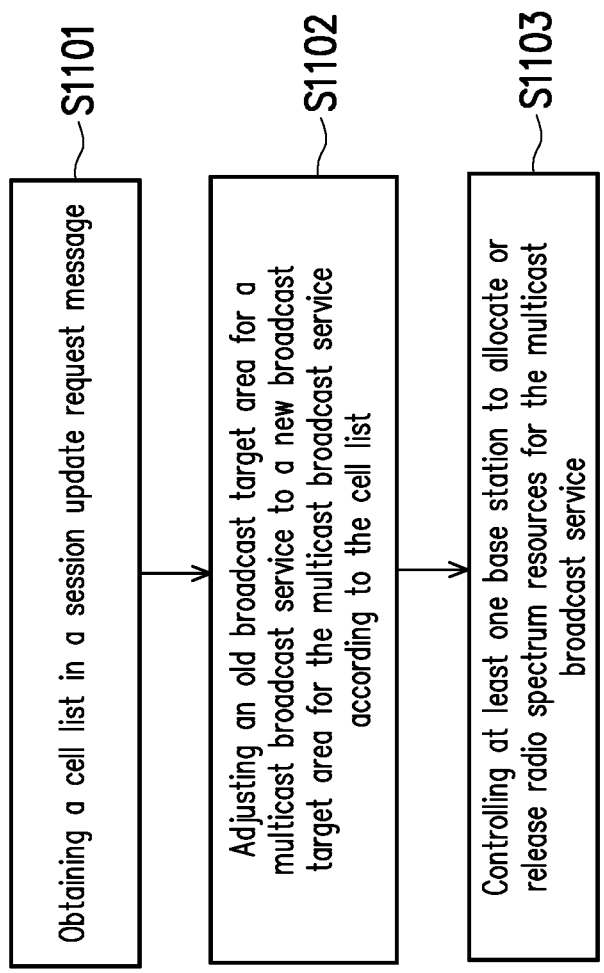
FIG. 11 is a flowchart showing adjustment of a multicast broadcast service area according to an embodiment of the disclosure.

FIG. 11 is a flowchart showing adjustment of a multicast broadcast service area according to an embodiment of the disclosure. The steps in FIG. 11 may be executed by the network apparatus 1000 shown in FIG. 10. In step S1101, a cell list in a session update request message is obtained. In step S1102, an old broadcast target area for a multicast broadcast service is adjusted to a new broadcast target area for the multicast broadcast service according to the cell list. In step S1103, at least one base station is controlled to allocate or release radio spectrum resources for the multicast broadcast service.

In view of the above description, the disclosure provides a method for adjusting a multicast broadcast service area. According to the embodiments of the disclosure, the broadcast target area of the multicast broadcast service may be dynamically determined according to the event-related information, and the configuration of the broadcast target area is flexible and more in line with the actual requirements. Therefore, it is possible to prevent user equipments irrelevant to an event from receiving a multicast broadcast service message, which can improve the spectrum efficiency and improve the use efficiency of unicast.

No element, act, or instruction used in the detailed description of disclosed embodiments of the present application should be construed as absolutely critical or essential to the disclosure unless explicitly described as such. Also, as used herein, each of the indefinite articles "a" and "an" could include more than one item. If only one item is intended, the terms "a single" or similar expressions would be used. Furthermore, the terms "any of" followed by a listing of multiple items and/or multiple categories of items, as used herein, are intended to include "any of", "any combination of", "any plurality of", and/or "any combination of pluralities of" the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of the disclosure provided they fall within the scope of the following claims and their equivalents.

What is claimed is:

1. A method for adjusting a multicast broadcast service area, adapted for a network apparatus, the method comprising:

obtaining a cell list in a session update request message;

adjusting an old broadcast target area for a multicast broadcast service to a new broadcast target area for the multicast broadcast service according to the cell list, wherein the new broadcast target area is associated with a V2X message of a V2X service from a service content provider, and the V2X message comprising event-related information of a road event; and controlling at least one base station to allocate or release radio spectrum resources for the multicast broadcast service, wherein the cell list is determined according to the event-related information of the road event, and the event-related information of the road event comprises an event coordinate location and a broadcast range, wherein the cell list indicates multiple target base stations in the new broadcast target area.

2. The method for adjusting a multicast broadcast service area according to claim 1, wherein the step of adjusting the old broadcast target area for the multicast broadcast service to the new broadcast target area for the multicast broadcast service according to the cell list comprises:

in response to the cell list comprising a first cell but the old broadcast target area not comprising the first cell, adjusting the old broadcast target area to the new broadcast target area by adding the first cell.

3. The method for adjusting a multicast broadcast service area according to claim 1, wherein the step of controlling the base station to allocate or release the radio spectrum resources for the multicast broadcast service comprises:

sending a scheduling information message to control a first base station corresponding to the first cell to allocate the radio spectrum resources for the multicast broadcast service.

4. The method for adjusting a multicast broadcast service area according to claim 1, wherein the step of adjusting the old broadcast target area for the multicast broadcast service to the new broadcast target area for the multicast broadcast service according to the cell list comprises:

in response to the old broadcast target area comprising a second cell but the cell list not comprising the second cell, adjusting the old broadcast target area to the new broadcast target area by removing the second cell.

5. The method for adjusting a multicast broadcast service area according to claim 4, wherein the step of controlling the base station to allocate or release the radio spectrum resources for the multicast broadcast service comprises:

sending a scheduling information message to control a second base station corresponding to the second cell to release the radio spectrum resources for the multicast broadcast service.

6. The method for adjusting a multicast broadcast service area according to claim 1, wherein before the step of obtaining the cell list in the session update request message, the method further comprises:

allocating a first resource pool belonging to a first mode and a second resource pool belonging to a second mode, wherein resource elements in the first resource pool are configured to transmit a broadcast service content of the multicast broadcast service, resource elements in the second resource pool are configured to transmit a broadcast service content of another multicast broadcast service, the multicast broadcast service belongs to the first mode, and the another multicast broadcast service belongs to the second mode.

7. The method for adjusting a multicast broadcast service area according to claim 6, wherein the step of controlling the base station to allocate or release the radio spectrum resources for the multicast broadcast service comprises:

controlling the base station to allocate or release the resource elements in the first resource pool.

8. The method for adjusting a multicast broadcast service area according to claim 7, wherein the target base station allocates the resource elements in the first resource pool to send a broadcast service content, and the target base station sends the broadcast service content according to the same resource elements.

9. The method for adjusting a multicast broadcast service area according to claim 7, wherein before the step of obtaining the cell list in the session update request message, the method further comprises:

obtaining a flag in a session start request message of the multicast broadcast service to determine that the multicast broadcast service belongs to one of the first mode and the second mode according to the flag; and in response to the flag matching a predetermined value, determining that the multicast broadcast service belongs to the first mode and suspending the multicast broadcast service.

10. A network apparatus comprising:

a transceiver; and a processor coupled to the transceiver, wherein the processor is configured to:

obtain a cell list in a session update request message, adjust an old broadcast target area for a multicast broadcast service to a new broadcast target area for the multicast broadcast service according to the cell list, wherein the new broadcast target area is associated with a V2X message of a V2X service from a service content provider, and the V2X message comprising event-related information of a road event, and control at least one base station to allocate or release radio spectrum resources for the multicast broadcast service, wherein the cell list is determined according to the event-related information of the road event, and the event-related information of the road event comprises an event coordinate location and a broadcast range, wherein the cell list indicates multiple target base stations in the new broadcast target area.

11. The network apparatus according to claim 10, wherein the processor is configured to:

in response to the cell list comprising a first cell but the old broadcast target area not comprising the first cell, adjust the old broadcast target area to the new broadcast target area by adding the first cell.

12. The network apparatus according to claim 11, wherein the processor is configured to:

send, by using the transceiver, a scheduling information message to control a first base station corresponding to the first cell to allocate the radio spectrum resources for the multicast broadcast service.

13. The network apparatus according to claim 10, wherein the processor is configured to:

in response to the old broadcast target area comprising a second cell but the cell list not comprising the second cell, adjust the old broadcast target area to the new broadcast target area by removing the second cell.

14. The network apparatus according to claim 13, wherein the processor is configured to:

send, by using the transceiver, a scheduling information message to control a second base station corresponding to the second cell to release the radio spectrum resources for the multicast broadcast service.

15. The network apparatus according to claim 10, wherein the processor is configured to:

allocate a first resource pool belonging to a first mode and a second resource pool belonging to a second mode, wherein resource elements in the first resource pool transmit a broadcast service content of the multicast broadcast service, resource elements in the second resource pool transmit a broadcast service content of another multicast broadcast service, the multicast broadcast service belongs to the first mode, and the another multicast broadcast service belongs to the second mode.

16. The network apparatus according to claim 15, wherein the processor is configured to:
control the base station to allocate or release the resource elements in the first resource pool.

17. The network apparatus according to claim 16, wherein the target base station allocates the resource elements in the first resource pool to send a broadcast service content, and the target base station sends the broadcast service content according to the same resource elements.

18. The network apparatus according to claim 15, wherein the processor is configured to:
obtain a flag in a session start request message of the multicast broadcast service to determine that the multicast broadcast service belongs to one of the first mode and the second mode according to the flag, and
in response to the flag matching a predetermined value, determine that the multicast broadcast service belongs to the first mode and suspend the multicast broadcast service.

* * * * *